United States Patent
Batz et al.

(10) Patent No.: US 7,792,128 B2
(45) Date of Patent: Sep. 7, 2010

(54) MAINTAINING A CONTENT CATEGORY CACHE AT A GATEWAY ON A DATA PATH

(75) Inventors: Robert M. Batz, Raleigh, NC (US); Mark Albert, Cary, NC (US); Chris O'Rourke, Apex, NC (US); Walter G. Dixon, Fuquay Varina, NC (US); Thomas R. Bakita, Raleigh, NC (US); Michael S. Sutton, Garner, NC (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 11/834,048

(22) Filed: Aug. 6, 2007

(65) Prior Publication Data

US 2009/0041036 A1 Feb. 12, 2009

(51) Int. Cl.
*H04L 12/56* (2006.01)
*H04J 1/16* (2006.01)

(52) U.S. Cl. .................. 370/401; 370/252; 370/389
(58) Field of Classification Search .............. 370/401, 370/252, 389
See application file for complete search history.

(56) References Cited

U.S. PATENT DOCUMENTS

| | | | |
|---|---|---|---|
| 6,065,055 A | 5/2000 | Hughes et al. | 709/229 |
| 6,122,657 A | 9/2000 | Hoffman, Jr. et al. | 709/201 |
| 6,605,120 B1 | 8/2003 | Fields et al. | 715/513 |
| 6,859,807 B1 | 2/2005 | Knight et al. | 707/10 |
| 7,043,555 B1* | 5/2006 | McClain et al. | 709/229 |
| 7,082,429 B2 | 7/2006 | Lin et al. | 707/5 |
| 7,506,055 B2* | 3/2009 | McClain et al. | 709/225 |
| 2005/0022114 A1* | 1/2005 | Shanahan et al. | 715/513 |
| 2005/0060404 A1* | 3/2005 | Ahlander et al. | 709/224 |
| 2006/0256788 A1 | 11/2006 | Donahue | 370/389 |
| 2007/0208711 A1* | 9/2007 | Rhoads et al. | 707/3 |
| 2007/0250487 A1* | 10/2007 | Reuther | 707/3 |
| 2008/0189307 A1* | 8/2008 | Sankaran et al. | 707/100 |
| 2009/0132718 A1* | 5/2009 | Groll et al. | 709/229 |

OTHER PUBLICATIONS

Patent Application entitled, "*Filtering Content According To A Filter Plan Using A Gateway On A Data Path*", 35 pages specification, claims and abstract, 4 pages of drawings, inventors Mark Albert, et al., Filed Aug. 6, 2007.
Office Action for U.S. Appl. No. 11/834,082, filed Aug. 6, 2007 by Mark Albert, 13 pages, Aug. 21, 2009.
Final Office Action for U.S. Appl. No. 11/834,082, filed Aug. 6, 2007 by Mark Albert, 10 pages, Feb. 1, 2010.

* cited by examiner

*Primary Examiner*—John Pezzlo
(74) *Attorney, Agent, or Firm*—Baker Botts L.L.P.

(57) ABSTRACT

Maintaining a content category cache includes storing the content category cache at a gateway. The content category cache includes content category mappings, where a content category mapping associates content with one or more categories describing the content. A request requesting content for a user is received. One or more categories associated with the requested content are determined from a content category mapping of the content category cache. The requested content is filtered in accordance with the categories.

14 Claims, 4 Drawing Sheets

US 7,792,128 B2

MAINTAINING A CONTENT CATEGORY CACHE AT A GATEWAY ON A DATA PATH

TECHNICAL FIELD

This invention relates generally to the field of telecommunications.

BACKGROUND

In certain communication networks, a content server provides content to a client. Access to particular content may be filtered according to a filter plan. A filter plan may designate categories of content, such as adult content, that the client may or may not access. The client may be allowed or denied access to content according to the filter plan.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF EXAMPLE EMBODIMENTS

Overview

According to one embodiment of the present invention, maintaining a content category cache includes storing the content category cache at a gateway. The content category cache includes content category mappings, where a content category mapping associates content with one or more categories describing the content. A request requesting content for a user is received. One or more categories associated with the requested content are determined from a content category mapping of the content category cache. The requested content is filtered in accordance with the categories.

According to another embodiment of the present invention, categorizing content includes receiving a first content identifier and a second content identifier. The first content identifier is mapped to a first raw category corresponding to a generic category. The second content identifier is mapped to a second raw category corresponding to the generic category. The first content identifier is mapped to the generic category to yield a first content category mapping. The second content identifier is mapped to the generic category to yield a second content category mapping.

Description

Embodiments of the present invention and its advantages are best understood by referring to FIGS. 1 through 5 of the drawings, like numerals being used for like and corresponding parts of the various drawings.

Figure 1:
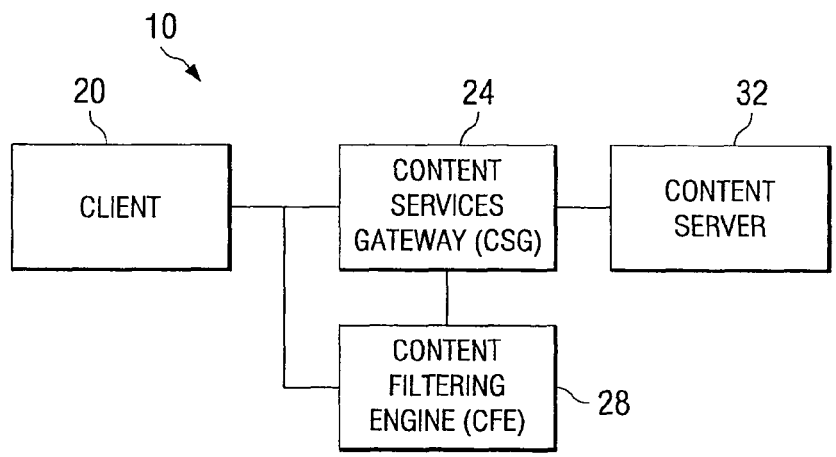
FIG. 1 illustrates one embodiment of a system that filters content for a client.

FIG. 1 illustrates one embodiment of a system 10 that provides services, for example, content services, to a client 20. In one embodiment, a content services gateway maintains a content category cache. The content category cache includes content category mappings, where a mapping maps content with categories describing the content. The content category cache may include mappings for the most frequently requested content. The mappings are used to determine categories of content requested by a user. Maintaining a cache at the content services gateway may provide for more efficient filtering of the content.

In another embodiment, content is categorized using a generic categorization. For example, one vendor maps content to a raw category specific to the vendor, and another vendor maps the same type of content to a different raw category specific to that vendor. The content is mapped to a generic category that corresponds to both raw categories. Categorizing content using a generic categorization may allow for efficient use of mappings from different vendors.

In the illustrated embodiment, communication system 10 includes a client 20, a content services gateway (CSG) 24, a content filtering engine (CFE) 28, and a content server (CS) 32 coupled as shown. In one embodiment of operation, client 20 sends a content request to content services gateway 24. Content services gateway 24 identifies a user from the content request, and then obtains a user filter plan and/or a global filter plan that designates categories of content that user may be denied and/or allowed access. Content services gateway 24 determines the categories describing the requested content from a local cache or from content filtering engine 28. Content services gateway 24 may then allow or deny the user access to the content based upon the filter plans.

Client 20 represents any suitable device operable to communicate with communication system 10. Examples of client 20 include a telephone, a personal digital assistant, a computer, a mobile handset, or any other device operable to communicate with system 10. Client 20 may be used by or otherwise associated with a user. A user refers to an entity (for example, a person, computer system, or company) that has a user account. A user may be identified by a user identifier.

System 10 provides communication sessions to clients 20. A communication session may refer to an active communication of packets. During a communication session, a service may be provided to client 20 as a transaction. For example, content server 32 provides content to client 20 as part of a content service. Information may be communicated during a service. Information may refer to voice, data, text, audio, video, multimedia, control, signaling, other information, or any combination of any of the preceding.

Content services gateway 24 comprises a network processor on a data path between client 20 and content server 32. Content services gateway 24 processes data packets received from client 20 and determines the disposition of the packets. For example, a packet may be forwarded to the packet destination, dropped, or redirected to another location.

In one embodiment, a data packet comprises a content request that requests content from content server 32 on the behalf of a user. Content services gateway 24 determines whether the user is allowed access to the content. If the user is allowed access, content services gateway 24 forwards the content request to content server 32. If the user is not allowed access, content services gateway 24 drops the content request or redirects the content request to another location.

In one embodiment, content services gateway 24 determines whether the user is allowed access to content according to one or more filter plans, such as global or user filter plans. A filter plan may designate categories of content and/or specific content identifiers (for example, universal resource identifiers (URIs) such as universal resource locators (URLs)) of content that a user may or may not access. Content services gateway 24 determines the categories of requested content from content category mappings, where a mapping maps content with categories describing the content. The mappings may be stored at a cache at content services gateway 24 or may be requested from content filtering engine 28. An embodiment of content services gateway 24 is described in more detail with reference to FIG. 2.

Content filtering engine 28 maintains vendor databases and provides content category mappings and filter plans to content services gateway 24. In one embodiment, the content category mappings map content to a generic category that corresponds to raw categories used by different vendors. For example, one vendor maps content to a raw category specific to the vendor, and another vendor maps the same type of content to a different raw category specific to that vendor. The content is mapped to a generic category that corresponds to the raw categories of both vendors.

In another embodiment, content filtering engine 28 includes a filter plan designer that may be used to design a filter plan for a specific user. A user interface, such as graphical user interface, displays categories that may be selected to indicate whether the user should be allowed or denied access to content of the selected categories. A filter plan may be generated for the user from the selected categories. An embodiment of content filtering engine 28 is described in more detail with reference to FIG. 2.

Content server 32 represents an entity that provides content to users as part of a content service. Content server 32 may include a server that may be accessed by client 20.

System 10 may include one or more networks that allow the components of system to communicate. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

System 10 may utilize any suitable communication protocols and/or technologies. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards. In one embodiment, system 10 may utilize ETSI communication protocols such as Global System for Mobile Communications (GSM) protocols that use General Packet Radio Services (GPRS) tunneling protocol.

A device of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated. Moreover, the operations of system 10 may be performed by more, fewer, or other components. For example, the operations of protocol identifier 50 and parsers 54 may be performed by one component, or the operations of billing system 62 may be performed by more than one component. Additionally, operations of system 10 may be performed using any suitable logic. As used in this document, "each" refers to each member of a set or each member of a subset of a set.

Figure 2:
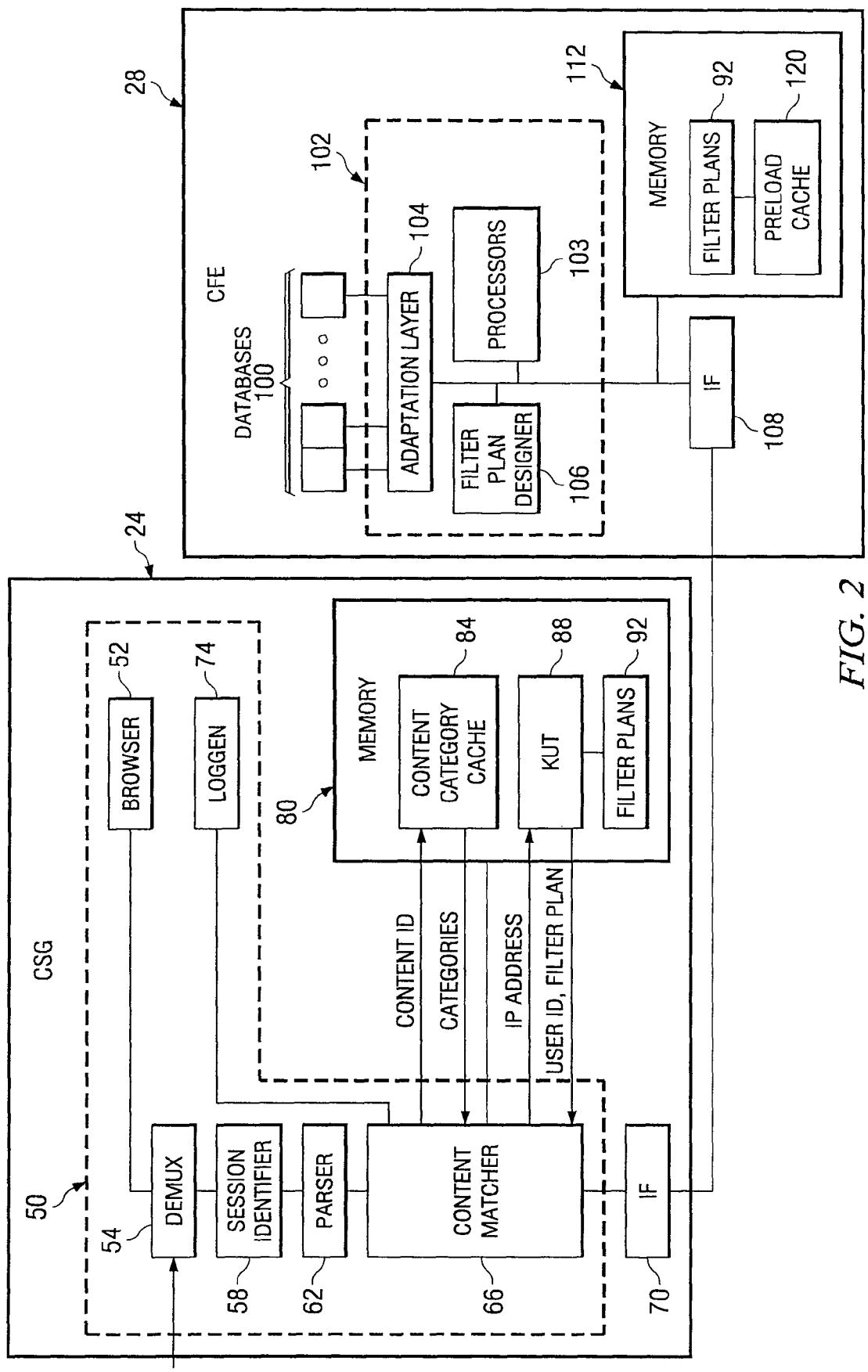
FIG. 2 illustrates one embodiment of a content services gateway and a content filtering engine that may be used in the system of FIG. 1.

FIG. 2 illustrates embodiments of content services gateway 24 and content filtering engine 28 that may be used in system 10 of FIG. 1.

Content services gateway 24 processes data packets received from client 20 associated with a user. In one embodiment, a data packet received from client 20 includes a content request requesting content from content server 32. The content request may include a content identifier (for example, a URI) identifying the requested content. The content request may also include a source address (for example, an IP address) that may be used to identify the user.

Content services gateway 24 includes any suitable components for processing data packets received from client 20. In the illustrated embodiment, content services gateway 24 includes logic 50 and a memory 80 coupled as shown. Logic 50 includes one or more processors 52, a demultiplexer 54, a session identifier 58, a parser 62, a content matcher 66, an interface (IF) 70, and a loggen 74 coupled as shown. Memory 80 stores a content category cache 84, a known user table (KUT) 88, and filter plans 92.

Processors 52 perform the operations of content services gateway 24. Demux 54 demultiplexes the content request from client 20. Session identifier 58 identifies the Session Internet Protocol/Transmission Control Protocol (IP/TCP) level. Parser 62 parses the request to obtain, for example, the source address and the content identifier of the requested content.

Content matcher 66 determines whether the user is allowed to access the requested content according to one or more filter plans 92. In one embodiment of operation, content matcher 66 sends the source address of the request to KUT 88 to retrieve the user identifier and filter plans 92 (for example, user and/or global filter plans). Content matcher 66 sends the content identifier (for example, the URI) of the requested content to content category cache 84 to retrieve categories describing the requested content. If memory 80 does not include the user filter plan and/or the categories, the information may be requested from content filtering engine 28.

In one embodiment, known user table (KUT) 88 includes address user mappings. Address user mappings may map an IP address to a user identifier, and may be populated using the Remote Authentication Dial In User Service (RADIUS) protocol.

In one embodiment, a filter plan 92 designates content that a user may or may not access. For example, a filter plan 92 may designate denied content, allowed content, or both allowed content and denied content. Content may be designated by a category describing the content (such as adult content) or a content identifier identifying the content (such as a URL). A filter plan 92 may also provide instructions for actions to take if access is allowed or denied. For example, if access is denied, a user may be redirected to another location or may be sent a message. The location or message may explain that the user has been denied access to the content.

Filter plans 92 include user, global, and/or default filter plans 92. A user filter plan 92 designates allowed and/or denied content for a particular user. A global filter plan 92 designates allowed and/or denied content for a group of users, such as users associated with a particular Internet provider. For example, a white list may designate that certain content, such as Internet provider content, is allowable. A black list may designate that certain content, such as terrorist content, is denied. A default filter plan may be used for a user if there is no filter plan associated with the user.

A filter plan 92 may also include a filter plan name, a redirect URL, a redirection flag, and/or other suitable information. The filter plan name identifies the filter plan. A redirect URL identifies a location to redirect requests for denied content. A redirect flag indicates that all content identifiers must be sent to content filtering engine 28.

Content matcher 66 checks whether the retrieved filter plans 92 designate allowability for the requested content. In one embodiment, content matcher 66 processes tokens of the content identifier until a token is found in a filter plan 92. For each token, content matcher 66 may search filter plans 92 for the token in any suitable manner. As an example, content matcher 66 may search first global lists and then the user filter plan.

Content matcher 66 may process tokens of the content identifier in any suitable manner. In an example of processing tokens, the content identifier comprises the URL:

http:\\www.abc.com\xyz\pqr\def

The tokens may be searched in the following order until a token is identified by a filter plan 92. First, the top level domain token is processed:

com

Then, subdomain tokens starting from the immediate left of the token level domain token and moving left are processed until the double slashes are reached:

abc.com www.abc.com

Pathname tokens starting from the token immediately to the right of the top level domain and moving to the right are then be processed:

www.abc.com/xyz www.abc.com/xyz/pqr www.abc.com/xyz/pqr/def

Content category cache 84 includes content category mappings that map content with categories describing the content. In one embodiment, a content category mapping maps a content identifier of content to one or more categories that describe the content. The mappings may be received from content filtering engine 28 through a preload or in response to a request from content services gateway 24.

Content category cache 84 may store selected mappings order to allow for efficient retrieval of mappings without requesting additional information from content filtering engine 28. For example, cache 84 may include mappings for content that has been most recently or most frequently requested. Recently requested content may include content requested within the past 1, 2, or 5 hours. Frequently requested content may include content requested by more than 5, 10, or 20 percent of the users. Mappings for less recently or less frequently requested content may be deleted.

For example, mappings may be deleted after an expiration period, or an older mapping may be deleted to allow a newer mapping.

A cache table may record the content identifiers that have mappings in cache 84. If the content identifier for requested content is not in the cache table, content services gateway 24 may request a mapping for the content identifier from content filtering engine 28. Content services gateway 24 may hold the content request until there is a response.

Interface 70 communicates with content filtering engine 28. Loggen 74 logs requests and disposition of the requests. Loggen 74 may provide the logged information to a filter mediation agent in a call detail recording (CDR).

Content filter engine 28 maintains databases 100 and provides content category mappings and/or filter plans 92 to content services gateway 24. Content filtering engine 28 includes databases 100, logic 102, and memory 112. Logic 102 includes one or more processors 103, an adaptation layer 104, and an interface 108. A filter plan designer 106 may also be included. Memory 112 stores filter plans 92, a preload cache 120, and other information such as raw and/or generic content category mappings.

Databases 100 include content category mappings. In one embodiment, a particular database 100 may be provided by a particular vendor, and may include raw mappings. A raw mapping maps content a raw category that is specific to the particular vendor.

Adaptation layer 104 maps content to generic categories. A generic category may be used to associate raw categories that describe the same or similar types of content. In one embodiment, adaptation layer 104 receives a raw mapping from a database 100. Adaptation layer 104 then maps the content to a generic category that corresponds to the raw category. The generic mappings may be stored in memory 112. An example of a generic categorization is described in more detail with respect to FIG. 4.

Filter plan designer 106 may be used to design a filter plan 92 for a particular user. Filter plan designer 106 may present a graphical user interface that may be used to design the filter plan 92. An example of a GUI template is described in more detail with reference to FIG. 5.

Content filtering engine 28 may provide filter plans 92 in any suitable manner. For example, content filtering engine 28 may provide filter plans 92 when content services gateway 24 is initialized or in response to a request from content services gateway 24. Preload cache 120 includes content category mappings that content filtering engine 28 provides to preload content category cache 84. Preload cache 120 may include mappings for frequently or recently requested content.

Figure 3:
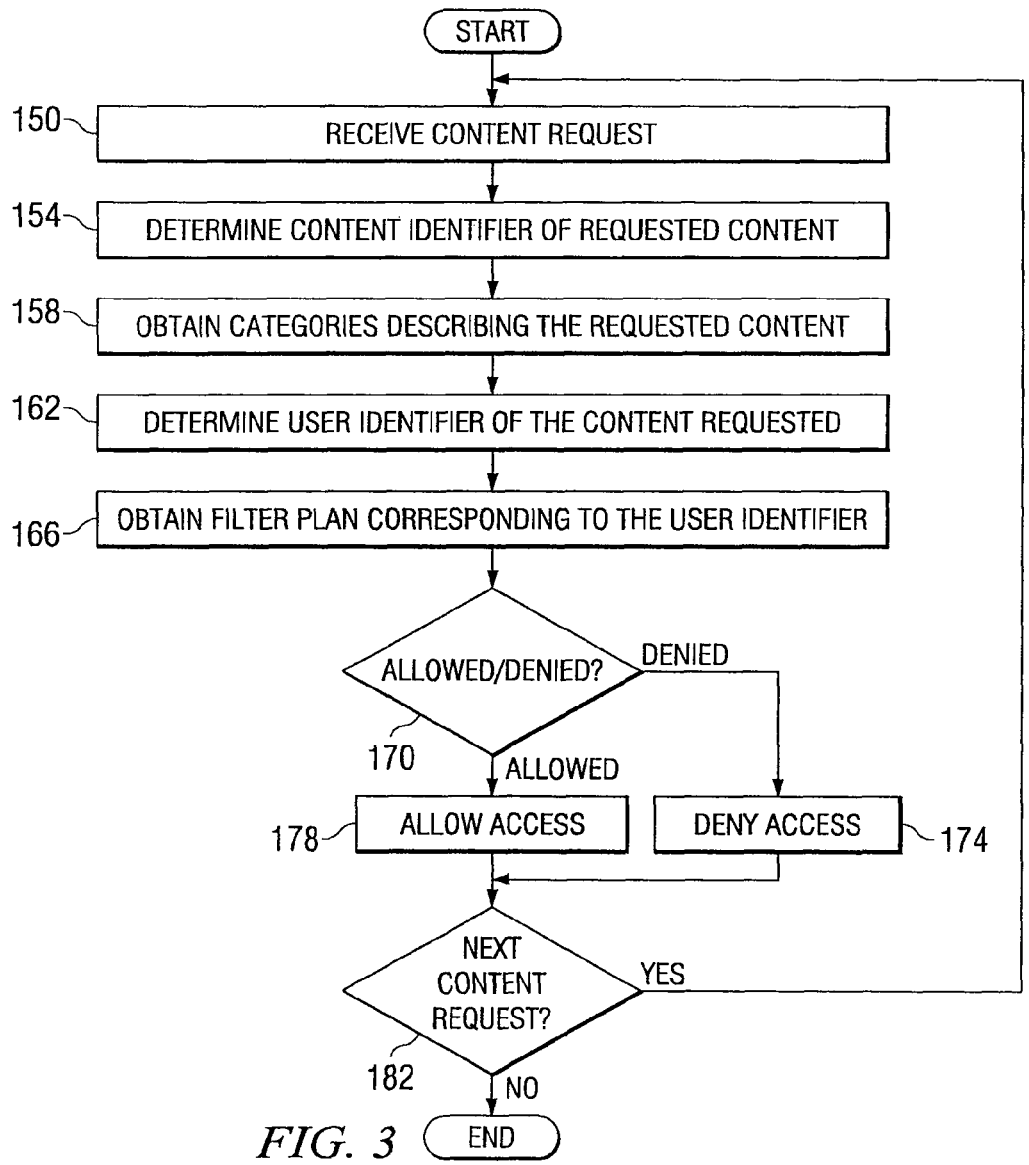
FIG. 3 illustrates one embodiment of a method for filtering content that may be used by the system of FIG. 1.

FIG. 3 illustrates one embodiment of a method for filtering content that may be used by system 10 of FIG. 1. The method begins at step 150, where content services gateway 24 receives a content request from client 20 associated with a user. The content request requests content for the user. Content services gateway 24 determines a content identifier of the requested content at step 154.

Categories describing the content are obtained at step 158. The categories may be obtained from a content category mapping associated with the content identifier. If content category cache 84 does not include the mapping, the mapping may be requested from content filter engine 28.

A user identifier associated with content request is determined at step 162. The user identifier may be determined from the source address of the request by known user table 88. A filter plan corresponding to the user identifier is obtained at step 166. The filter plan designates categories that may or may not be accessed by the user, and may be obtained from memory 80 or from memory 112.

The user may be allowed or denied access to content at step 170. If the user is denied access at step 170, the method proceeds to step 174, where content services gateway 24 denies the user access to the content. Content services gateway 24 may drop the content request and/or redirect the client to a URL informing client 20 that access has been denied. If the user is allowed access at step 170, the method proceeds to step 178, where content services gateway 24 allows the user access to the requested content. Content services gateway 24 may forward the content request to content server 32.

There may be a next content request at step 182. If there is a next content request, the method returns to step 150, where the next content request is received. If there is no next content request, the method terminates.

Modifications, additions, or omissions may be made to the method without departing from the scope of the invention. The method may include more, fewer, or other steps. Additionally, steps may be performed in any suitable order.

Figure 4:
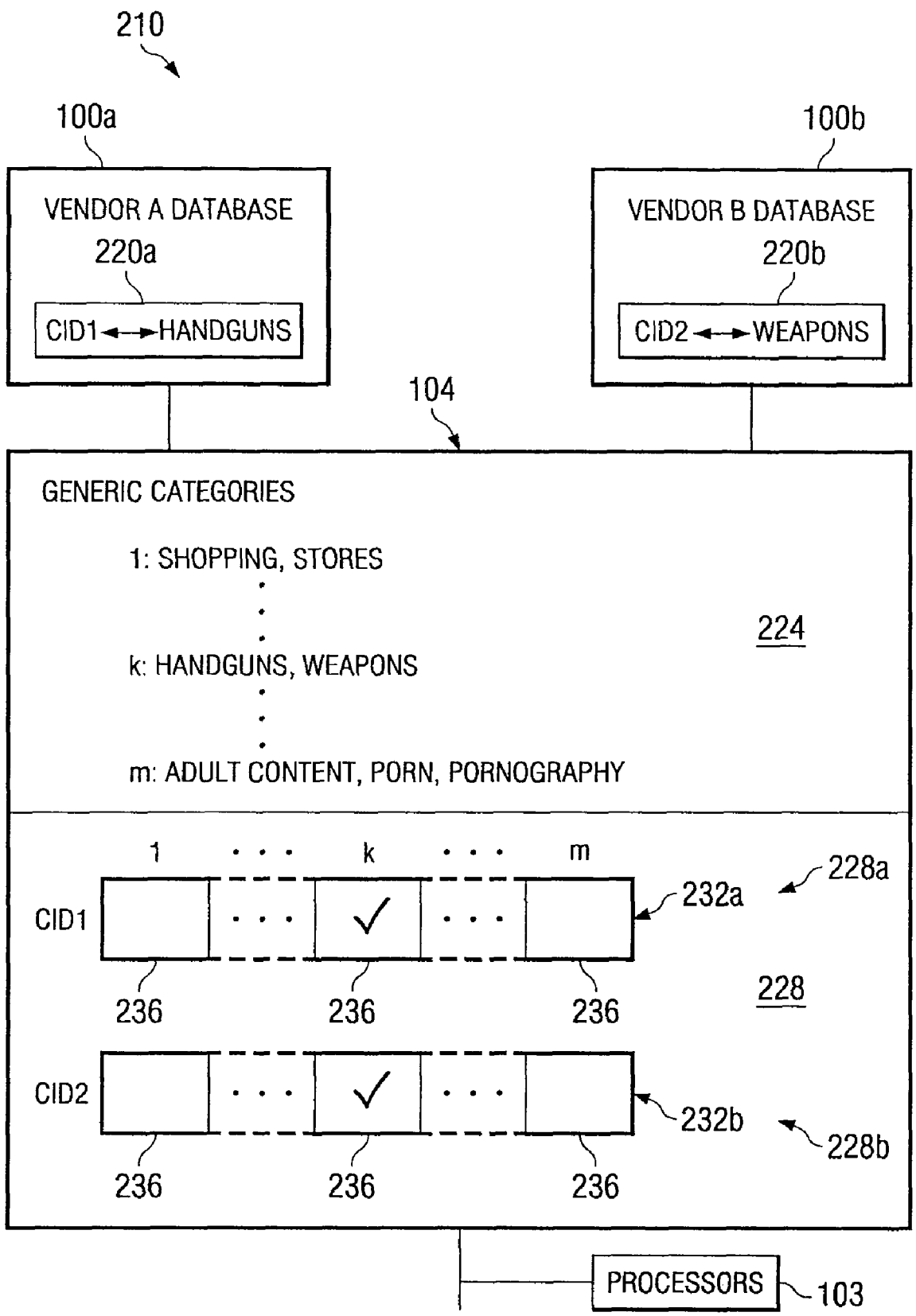
FIG. 4 illustrates one embodiment of a normalized categorization.

FIG. 4 illustrates one embodiment of a method for generically categorizing content. A diagram 210 shows databases 100, processors 103, adaptation layer 104, raw mappings 220, generic categories 224, generic mappings 228, entries 232, and flags 236.

In the illustrated embodiment, databases 100 are provided by specific vendors. Database 100a is provided by Vendor A, and database 100b is provided by Vendor B. Databases 100 include raw mappings 220. A raw mapping 220 maps content (identified by a content identifier) to one or more raw categories that describe the content. In the illustrated embodiment, raw mappings 220a are associated with Vendor A, and raw mappings 220b are associated with Vendor B. In the example, raw mapping 220a maps content CID1 to a "handguns" category, and mapping 220b maps content CID2 a "weapons" category.

Adaptation layer 104 converts the raw mappings 220 to generic mappings 228. Generic categories 224 group raw categories that described the same or similar type of content. In the illustrated embodiment, generic category 1 groups "shopping" and "stores" raw categories; generic category k groups "handguns" and "weapons" raw categories; and generic category m groups "adult content," "porn," and "pornography" raw categories.

A generic mapping 228 maps content of a raw mapping to the generic category corresponding to the raw category. According to the illustrated embodiment, the "handguns" and "weapons" raw categories correspond to category k. Accordingly, generic mapping 228a maps content CID1 to category k, and generic mapping 228b maps content CID2 to category k.

Generic mappings 228 may be recorded in any suitable manner. In the illustrated embodiment, an entry 232 comprising flags 236 indicates the categories of particular content, where a flag 236 corresponds to a category. A flag 236 corresponding to a category may be selected (or deselected) to indicate that content is mapped to the category. In the illustrated embodiment, flags associated with category k are selected to indicate that content CID1 and CID2 are mapped to category k.

Mappings in the form of entries 232 may be sent to content services gateway 24. Entries 232 allow content services gateway 24 to use information from different vendors without knowledge of the raw categories. Moreover, categories may be readily modified at adaptation layer 104 without affecting the performance of content services gateway 24. For example, categories may be added, deleted, or regrouped.

In one embodiment, processors 103 may generate a filter plan 92 that uses generic categories to designate allowed and/or denied content for a user. For example, a filter plan 92 may designate that a user is denied access to content described by category k. Content services gateway 24 need not know raw mappings 220 of each vendor. Thus, content services gateway 24 may efficiently filter according to a filter plan.

Modifications, additions, or omissions may be made to the method without departing from the scope of the invention. The method may include more, fewer, or other steps. Additionally, steps may be performed in any suitable order.

Figure 5:
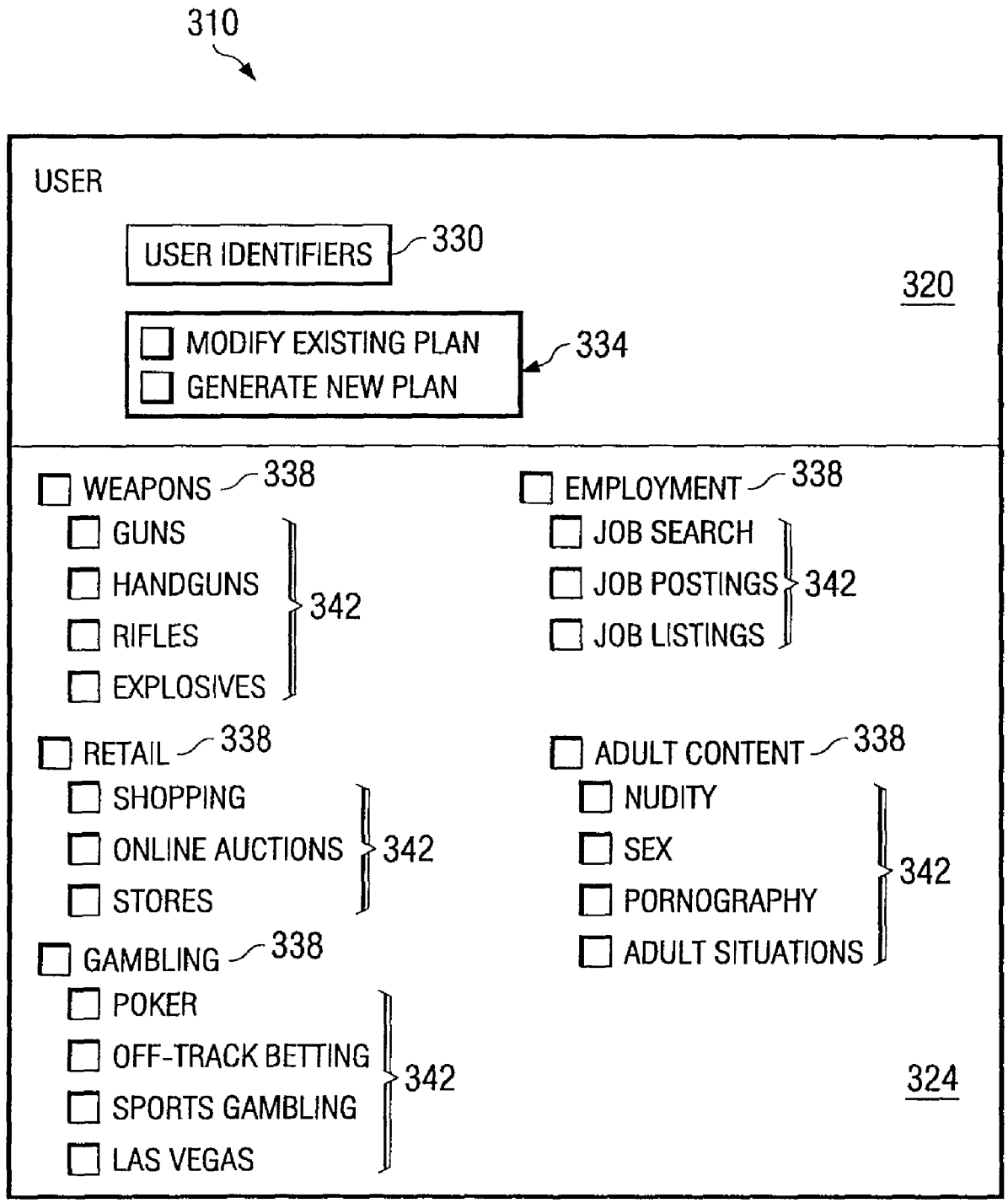
FIG. 5 illustrates one embodiment of a graphical user interface (GUI) template that may be used to design a filter plan for a user.

FIG. 5 illustrates one embodiment of a graphical user interface (GUI) template 310 that may be used to design a filter plan. Input information may be submitted through template 310 in any suitable manner. For example, information may be submitted using a selector such as a pull-down menu, a box that may be checked a field in which text may be input, or other suitable selector.

Template 310 includes a user section 320 and a category section 324. User section 320 includes a user identifier selector 330 and a plan selector 334. User identifier selector 330 may be used to select one or more users for which a filter plan is being designed. User identifiers corresponding to the users may be submitted through user identifier selector 330. In one embodiment, user identifier selector 330 may be used to select a group of users, such as system administrators. Plan selector 334 may be used to select a filter plan. In the illustrated embodiment, an existing filter plan may be modified or a new filter plan may be generated.

Category section 324 includes one or more category options 338. A category option 334 may include one or more subcategory options 342. In one embodiment, an option may be selected to deny access. In another embodiment, an option may be selected to allow access. In another embodiment, an option may be selected in one way to deny access and in another way to allow access. For example, an "X" may deny access, and a check may allow access.

Category options 338 and subcategory options 342 include: a weapons category (with guns, handguns, rifles, and explosives subcategories), an adult content category (with nudity, sex, pornography, and adult situations subcategories), a retail category (with shopping, online auctions, and stores subcategories), a gambling category (with poker, off-track betting, sports gambling, and has Vegas subcategories), an employment category (with job search, job postings, and job listings subcategories).

A designed filter plan may be stored at a system that is used to maintain user information, such as user IDs and pass codes. For example, a RADIUS server, a user database, or a quota server may be used. The server is accessed when the user logs onto the network. The server may send the filter plan to content services gateway 24 in a RADIUS message that may provide other user information.

Modifications, additions, or omissions may be made to template 310 without departing from the scope of the invention. Template 310 may include more, fewer, or other fields or information. Additionally, the fields or information may be organized in any suitable manner.

Certain embodiments of the invention may provide one or more technical advantages. A technical advantage of one embodiment may be that a content services gateway maintains a content category cache. The content category cache includes content category mappings, where a mapping maps content with categories describing the content. The mappings are used to determine categories of content requested by a user. Maintaining a cache at the content services gateway may provide for more efficient filtering of the content.

Another technical advantage of one embodiment may be that the content category cache includes mappings for the most frequently requested content. Accordingly, the cache may readily provide more useful mappings.

Another technical advantage of one embodiment may be that content is categorized using a generic categorization. For example, one vendor maps content to a raw category specific to the vendor, and another vendor maps the same type of content to a different raw category specific to that vendor. The content is mapped to a generic category that corresponds to both raw categories.

Certain embodiments of the invention may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
accessing, by a processor comprising hardware, a first content identifier mapped to a first raw category, the first raw category associated with a first vendor and labeled using a first term, the first raw category corresponding to a generic category;
accessing, by the processor, a second content identifier mapped to a second raw category, the second raw category associated with a second vendor and labeled using a second term different from the first term, the second raw category corresponding to the generic category;
mapping, by the processor, the first content identifier to the generic category to yield a first content category mapping;
mapping, by the processor, the second content identifier to the generic category to yield a second content category mapping;
determining that a content services gateway has initialized; and
sending the first content category mapping to the content services gateway in response to the determination.

2. The method of claim 1, further comprising:
determining that the first raw category corresponds to the generic category according to a grouping; and
determining that the second raw category corresponds to the generic category according to the grouping.

3. The method of claim 1, further comprising:
sending at least one of the first content category mapping or the second content category to a content services gateway.

4. The method of claim 1, wherein mapping the first content identifier to the generic category to yield the first content category mapping further comprises:
accessing an entry corresponding to the first content identifier, the entry comprising one or more flags; and
setting a flag corresponding to the generic category to indicate the mapping.

5. The method of claim 1, further comprising:
receiving a request for the second content category mapping; and
sending the second content category mapping to a content services gateway in response to the request.

6. The method of claim 1, further comprising: generating a filter plan indicating whether the generic category is allowed or denied.

7. An apparatus, comprising:
a memory operable to:
store a first content identifier mapped to a first raw category, the first raw category associated with a first vendor and labeled using a first term, the first raw category corresponding to a generic category;
store a second content identifier mapped to a second raw category, the second raw category associated with a second vendor and labeled using a second term different from the first term, the second raw category corresponding to the generic category; and
one or more processors comprising hardware and operable to:
map the first content identifier to the generic category to yield a first content category mapping;
map the second content identifier to the generic category to yield a second content category mapping;
determine that a content services gateway has initialized; and
send the first content category mapping to the content services gateway in response to the determination.

8. The apparatus, of claim 7, the one or more processors further operable to:
determine that the first raw category corresponds to the generic category according to a grouping; and
determine that the second raw category corresponds to the generic category according to the grouping.

9. The apparatus, of claim 7, the one or more processors further operable to:
send at least one of the first content category mapping or the second content category to a content services gateway.

10. The apparatus, of claim 7, the one or more processors further operable to map the first content identifier to the generic category to yield the first content category mapping by:
accessing an entry corresponding to the first content identifier, the entry comprising one or more flags; and
setting a flag corresponding to the generic category to indicate the mapping.

11. The apparatus, of claim 7, wherein:
the first raw category is associated with a first vendor; and
the second raw category is associated with a second vendor.

12. The apparatus, of claim 7, the one or more processors further operable to:
receive a request for the second content category mapping; and
send the second content category mapping to a content services gateway in response to the request.

13. The apparatus, of claim 7, the one or more processors further operable to:
generate a filter plan indicating whether the generic category is allowed or denied.

14. A system, comprising:
means for receiving a first content identifier mapped to a first raw category, the first raw category associated with a first vendor and labeled using a first term, the first raw category corresponding to a generic category;
means for receiving a second content identifier mapped to a second raw category, the second raw category associated with a second vendor and labeled using a second term different from the first term, the second raw category corresponding to the generic category;
means for:
mapping the first content identifier to the generic category to yield a first content category mapping; and
mapping the second content identifier to the generic category to yield a second content category mapping, the means for mapping comprising hardware;
means for determining that a content services gateway has initialized; and
means for sending the first content category mapping to the content services gateway in response to the determination.

* * * * *